Patented June 9, 1953

2,641,524

UNITED STATES PATENT OFFICE 2,641,524

ACRYLONITRILE-VINYL AMINE INTERPOLYMERS AND METHOD OF MAKING

David W. Chaney, Nether Providence, Pa., and Helen G. Sommar, Wilmington, Del., assignors to American Viscose Corporation, Wilmington, Del., a corporation of Delaware No Drawing. Application July 13, 1949, Serial No. 104,592

16 Claims. (Cl. 8—55)

This invention relates to new acrylonitrile polymers containing both CN groups and $NH_2$ groups in the polymer molecule. More particularly, the invention relates to shaped articles comprising the new acrylonitrile polymers and to such articles dyed with an acid wool type dyestuff.

The new polymers containing both CN and $NH_2$ groups in the molecule are obtained by reacting upon an acrylonitrile polymer containing from 35 to 98%, preferably from 70 to 98% acrylonitrile in the polymer molecule, and containing $CONH_2$ groups in addition to CN groups, with an aqueous alkaline solution of an alkali metal hypohalite whereby at least a portion of the amido groups in the polymer molecule are converted to amino groups. The conversion of amido groups to amino groups is established by comparison of the infra-red spectra of the polymer before and after treatment with the aqueous alkaline alkali metal hypohalite solution. The carbonyl group in an organic molecule vibrates to give a characteristic and intense band in the infra-red spectrum of the compound containing it, the frequency of the band depending on the group to which the carbonyl group is attached. According to Beer's law there is a direct linear relationship between the concentration of the carbonyl group and the optical density or intensity of the infra-red absorption band. One examination of the infra-red spectrum for the acrylonitrile polymer treated with the aqueous alkaline alkali metal hyphoalite solution, it is found that the optical density of the carbonyl absorption band has decreased, the frequency of vibration remaining the same. This indicates a reduction of the concentration of carbonyl groups in the polymer, and the existence of amino groups therein which are not attached to carbonyl.

In the preferred embodiment, the starting polymer or shaped article thereof contains, initially, from 70 to 98% acrylonitrile by weight, in the molecule and correspondingly from 2 to 30% acrylamide or methacrylamide, and by the hypohalite treatment from 5% to 50% or more of the amido groups present initially are converted to amino groups. The CN groups are not affected by the alkaline alkali metal hypohalite solution and the final product comprises, usually, a ternary polymer containing, in the molecule, from 70 to 98% by weight acrylonitrile, from 0.1% to 15% vinyl amine, and the balance acrylamide or methacrylamide.

The polymers treated with the alkaline alkali metal hypohalite solution, either in bulk, e. g., in the form of a powder, or in the form of a shaped article, can be dyed with the acid wool dyestuffs to intense brilliant shades by the conventional wool-dyeing procedures. The intensity of shade of the dyed polymer can be measured by measuring the light reflectance and referring the value obtained to the value of 50 for a white material which reflects all the light and a value of 0 for a black material. Generally, the light reflectance of the dyed acrylonitrile polymer containing 70 to 98% acrylonitrile and the balance acrylamide is at least twice that of the dyed polymer which is pretreated with the aqueous alkaline alkali metal hypohalite solution prior to being dyed.

Preferably, the polymer containing CN groups and $CONH_2$ groups is treated with an aqueous alkaline sodium hypochlorite solution and in every instance the receptivity of the polymer for acid wool dyes is improved. However, in order to modify the dyeing capacity of the polymer while avoiding polymer degradation, the treating time and temperature must be correlated, taking account of the concentration of sodium hypochlorite in the treating liquid. Yarns of an acrylonitrile-acrylamide copolymer containing 79.1 mole per cent (73.7 weight per cent) of acrylonitrile and the balance acrylamide which were immersed in 4.8% aqueous alkaline sodium hypochlorite for 30 minutes at temperatures of 55 to 65° C., were seriously degraded, whereas yarns of the copolymer which were immersed in a solution of the same concentration for 30 minutes at 35 to 45° C., were not degraded although the dye receptivity of the yarns was modified so that the yarns were dyed to a deep red color in a dyebath containing Wool Fast Scarlet G Supra, under the conventional conditions for dyeing wool. By elevating the temperature and increasing the concentration of sodium hypochlorite, the treating time required to modify the dyeing capacity is appreciably decreased. Yarns of the acrylonitrile-acrylamide copolymer which were immersed in 5.2% aqueous alkaline sodium hypochlorite for 2 minutes at 60 to 65° C. were not degraded and were dyed to shades at least as intense as the shade obtained on wool under the same dyeing conditions. Excellent dyeings were also obtained on different lots of yarns of the acrylonitrile-acrylamide copolymer which had been immersed in the treating liquid containing 5.2% sodium hypochlorite for periods of four minutes, 1.5 minutes, and 0.5 minute, respectively, at a temperature between 60 and 65° C. Lower temperatures can be used, but these require longer treating times and the yarns obtained are not as satisfactory as those treated at the higher temperatures for shorter periods of time. It is obvious from these results that the treating time and temperature of the treating liquid are critical to successful modification of the receptivity of the polymers for acid dyes without impairment of their usefulness. In general, the acrylonitrile polymer containing amido groups is treated with aqueous alkaline sodium hypochlorite of from 3 to 6% concentration for from 5 seconds to 30 minutes at a temperature inversely related to the time and preferably between 65° C. and 35° C. In the preferred modification of the invention, the polymer is treated with an aqueous alkaline sodium hypochlorite solution of from 5 to 6% concentration for from 5 seconds to 5 minutes, at a temperature from 60 to 65° C.

For the purposes of this invention, the method by which the amido groups are introduced into the acrylonitrile polymer is not critical. The amido groups may be introduced concurrently with production of the polymer, by copolymerizing acrylonitrile with acrylamide or methacrylamide or amido groups may be introduced into an acrylonitrile polymer after its production. For example, a portion of the CN groups in polyacrylonitrile or copolymers of acrylonitrile may be hydrolyzed to $CONH_2$ groups. One method of converting a portion of the CN groups of an acrylonitrile polymer, for example polyacrylonitrile, to $CONH_2$ groups, involves treating the homopolymer with strong sulfuric acid. The conditions of the sulfuric acid treatment required to convert a sufficient proportion of CN groups to $CONH_2$ groups to result in enhanced receptivity of the polymer for the acid wool dyes when the shaped article is treated with the alkaline hypohalite solution are critical. For example, when yarns of polyacrylonitrile were treated with 70% sulfuric acid at 100° C. for 5 minutes, the proportion of CN groups hydrolyzed to $CONH_2$ groups was not sufficient and, after treatment with the alkaline aqueous sodium hypochlorite solution, the improvement in receptivity of the article for the acid wool dyes was not impressive. On the other hand, different lots of polyacrylonitrile yarns were disintegrated when they were immersed for 30 seconds in 85% sulfuric acid at 25° C.; for 3 minutes in 75% sulfuric acid at 100° C.; and for 4 minutes in 75% sulfuric acid at 85° C. Both the time and temperature are critical and must be correlated. Preferably, the polyacrylonitrile yarns are treated with 70% sulfuric acid at 100° C. for 15 minutes. Good results can be obtained by treating the yarns with 65 to 75% sulfuric acid for periods ranging from 2 minutes to 25 minutes at temperatures varying inversely with the concentration of the acid between 100 and 85° C. The most satisfactory conditions are given in Table I below:

*Table I*

| $H_2SO_4$ | Time, minutes | Temperature, ° C. |
|---|---|---|
| 70% | 15 | 100 |
| 75% | 2 | 85 |
| 70% | 10 | 100 |
| 65% | 25 | 100 |

The product resulting from the sulfuric acid treatment comprises an acrylonitrile polymer which is, in effect, a copolymer of acrylonitrile containing from 70 to 98% acrylonitrile and from 2 to 30% of acrylamide.

Copolymers of acrylonitrile with other polymerizable monomers may be treated with sulfuric acid to hydrolyze a portion of the CN groups to $CONH_2$ groups. Copolymers of acrylonitrile with vinyl acetate containing from 70 to 98% acrylonitrile may be treated with sulfuric acid under the conditions given in Table I, and thereafter treated with the aqueous alkaline alkali metal hypohalite solution. Copolymers of acrylonitrile with vinyl chloride and containing between 40 and 50% acrylonitrile are more resistant to hydrolysis by sulfuric acid, and the conditions required to hydrolyze a portion of the CN groups to $CONH_2$ groups are more severe. Suitable conditions are given in Table II:

*Table II*

| $H_2SO_4$ | Time | Temperature, ° C. |
|---|---|---|
| 85% | 2 minutes | 75-80 |
| 75% | 5 minutes | 100 |
| 85% | 15 seconds | 85 |

The polymer may be treated with the aqueous alkaline alkali metal hypohalite solution in bulk condition, and thereafter dissolved in a suitable solvent and formed into an article of the desired shape by conventional shaping procedures. However, in the preferred embodiment, the polymer is treated in the form of a shaped article, such as fibers, including staple fibers, filaments, yarns, etc. Fibers, filaments, or yarns of the acrylonitrile polymer containing both CN and $CONH_2$ groups may be treated with the aqueous alkaline sodium hypochlorite solution after they have been washed to remove residual spinning solvent, dried, heat-stretched for orientation, and thereafter stabilized under heating in a free-to-shrink condition. The fibers heated in the free-to-shrink condition are stabilized against shrinkage on heating thereof at the temperature at which the stabilization is performed. In the alternative, fibers, filaments, or yarns comprising a copolymer of acrylonitrile and acrylamide may be treated with the aqueous alkaline alkali metal hypohalite solution in the "green" condition, i. e., after washing thereof to remove residual spinning solvent and prior to initial drying. The latter procedure is preferred when the yarns comprise a copolymer of acrylonitrile and acrylamide containing 10% by weight or less, that is, from 2 to 10% by weight, of acrylamide or methacrylamide in the molecule. The properties of the fibers, filaments, or yarns, such as tenacity, elongation, etc. are not materially altered by the treatment with the aqueous alkaline alkali metal hypohalite solution, particularly if the fibers, etc. are treated with that solution after they have been oriented by heat-stretching and stabilized under heating in a relaxed, free-to-shrink condition prior to the hypohalite treatment.

The starting polymer or copolymer of acrylonitrile and acrylamide or methacrylamide may be heterogeneous or homogeneous. Heterogeneous polymers are made up of mixtures of high and low polymers (with respect to both molecular weight and composition) and are generally obtained when the polymerization is effected by the known bulk, solution, emulsion, or dispersion polymerization procedures. Homogeneous polymers are those in which the molecular weight of the individual polymeric chains approximate or is the same as the molecular weight of the polymer as a whole. Homogeneous copolymers are those in which the molecular weight and composition of the individual polymeric chains approximates or is the same as the composition of the polymer as a whole. Homogeneous polymers or copolymers may be obtained by conducting the polymerization in solution, under reflux, in the presence of a catalyst which is soluble in the solvent, and adding the monomer (or mixture of the comonomers, in the case of copolymers) to the solution at a controlled rate to maintain the temperature of reflux (and rate of reflux, in the case of copolymers) substantially constant.

An outstanding characteristic of the polymers obtained by the method described herein is the capacity to accept acid wool type dyestuffs and to be dyed to deep, brilliant shades by those dyes. This characteristic is attributed to the amino groups which are present in the molecule after the polymer containing CN and $CONH_2$ groups is treated with the aqueous alkaline alkali metal hypohalite solution. The affinity or receptivity for the acid wool dyes is "built into" the acrylonitrile polymer molecule so that the yarns or other articles can be dyed more satisfactorily by usual procedures than articles consisting of polyacrylonitrile or copolymers thereof with monomers which do not contain basic nitrogen.

The following examples in which parts, proportions, and percentages are by weight unless otherwise specified illustrate certain preferred embodiments of the invention. It is to be understood that the invention is not limited by the specific details set forth in these representative examples.

EXAMPLE I

A homogeneous copolymer of acrylonitrile and acrylamide containing in the molecule about 88% acrylonitrile and about 12% acrylamide is dissolved in dimethylformamide to give a 15% solution, and the solution is spun through a spinneret having 18 holes, each having a diameter of .004 inch into a bath of isopropanol at 23° C. After an immersion of 25 inches the yarn is withdrawn from the bath, stretched 200% between godets, and then washed continuously first with cold water and then with hot water (95° C.) for from 1½ to 2 minutes. The yarn is air-dried at constant length, and thereafter heat-stretched 250% by passing it through a tube heated to a temperature of 170° C. The heat-stretched yarn is then immersed in 5.2% aqueous alkaline sodium hypochlorite solution at 65° C. for 2 minutes, withdrawn from the solution, rinsed, and dried. By infra-red spectrum analysis, the yarn is found to comprise a copolymer of acrylonitrile, acrylamide, and vinyl amine.

The heat-stretched yarn comprising the copolymer of acrylonitrile, acrylamide, and vinyl amine is stabilized by heating it at 100 to 175° C. for 5 minutes in a free-to-shrink condition.

A dyebath is prepared by mixing 40 parts of water, 1 part of a 2% solution of Wool Fast Scarlet G Supra Conc. (C. I. No. 252) 1 part of 3% sulfuric acid solution, and 1 part of 7.5% calcined Glauber's salt solution. The yarns are entered into the bath at 40° C. and the temperature is raised to the boil. Dyeing is continued for ½ hour at the elevated temperature. The dyed yarn is then rinsed in hot water (50° C.) and air-dried.

By this procedure, the yarns are dyed a deep dark red. The color is several times more intense than the color of yarn comprising an acrylonitrile-acrylamide copolymer containing 88% acrylonitrile and 12% acrylamide which is dyed with Wool Fast Scarlet G Supra under the same conditions.

The process may be modified so that the heat-stretched fibers or yarns are reduced to staple lengths either before or after the treatment with the aqueous alkaline sodium hypochlorite solution, or before or after dyeing thereof.

EXAMPLE II

Example I is repeated, with the exception that the copolymer which is spun into yarns is an acrylonitrile-methacrylamide copolymer containing about 88% acrylonitrile and about 12% methacrylamide. The results are substantially the same as in Example I.

EXAMPLE III

A heterogeneous copolymer of acrylonitrile and acrylamide (produced by the conventional solution polymerization procedure) containing in the molecule 80% by weight acrylonitrile and 20% acrylamide is dissolved in dimethylformamide to give a 12% solution. The solution is spun into isopropanol at 40-45° C. The yarn is withdrawn from the bath by means of take-up godets and stretched 125% between the take-up godets and a pair of godets rotating in a cold water bath, after which it is washed on a drum with boiling water to remove residual spinning solvent and stretched 200% in hot air at a temperature of 175° C. The yarn is stabilized by heating it in 100° C. in water, in a free-to-shrink condition. The stabilized yarn is immersed in a 4.8% aqueous alkaline sodium hypochlorite solution for 30 seconds at 65° C., removed from the solution, rinsed and dried. By infra-red spectrum analysis, the yarn is found to comprise a copolymer of acrylonitrile, acrylamide, and vinyl amine, approximately 17% of the $CONH_2$ groups initially present in the copolymer being converted to amino groups. The composition of the copolymer is 80% acrylonitrile, approximately 3.4% vinyl amine, and approximately 16.6% acrylamide.

The yarn is dyed to an intense brilliant shade by dyeing it in a dyebath similar to the bath described in Example I, except that the dyestuff is Conacid Orange Y Conc. (C. I. No. 151).

EXAMPLE IV

A 14% solution of a homogeneous copolymer of acrylonitrile and acrylamide containing 82.2% acrylonitrile and 17.8% acrylamide in the molecule, in dimethylformamide is spun into isopropanol at 25° C. through a spinneret having 18 holes each having a diameter of 4 mils. The solution is pumped at a rate of 2.1 cc./min. and the fibers are given an immersion of 24", taken up at the rate of 26 ft./min., stretched by 250%, and washed.

After the fibers are thoroughly washed, dried and oriented by stretching them 275 to 350% of their original length in a hot air tube 30" long at temperatures from 165 to 215° C., the denier is reduced to 20 to 28. The fibers have dry tensile strengths of 4.9 to 5.5 gms./denier, dry extensibilities of 7 to 9% at break.

The fibers are immersed in a 5.2% aqueous alkaline solution of sodium hypochlorite for 4 minutes at 60-65° C., rinsed, and dried. The fibers comprising the ternary polymer containing acrylonitrile, acrylamide, and vinyl amine are dyed to an intense blue shade in a dyebath similar to that described in Example I but containing, as the dyestuff, Fast Acid Blue SR (C. I. No. 208).

EXAMPLE V

A 15% solution of a homogeneous copolymer containing 93% by weight acrylonitrile and 7% acrylamide in dimethylformamide is spun into isopropanol at room temperature. After an immersion of 25 inches, the yarn is withdrawn, stretched 200%, and washed to remove residual spinning solvent.

Prior to initial drying, the washed yarn is immersed in a 5.2% aqueous alkaline solution of sodium hypochlorite at 65° C. for 3 minutes, withdrawn, rinsed, and dried.

The yarn is heat-stretched 200% in hot air at 170° C. and stabilized by heating it at 100° C. in water, in a free-to-shrink condition. It is then dyed to an intense green shade in a dyebath similar to the bath of Example I, but containing, as the dyestuff, Naphthol Green B Conc. (C. I. No. 5).

EXAMPLE VI

A skein of yarns of polyacrylonitrile in the completely "set" condition (free from absorbed coagulating liquid) is immersed for 15 minutes in 70% sulfuric acid at 100° C., washed free of acid with water, and immersed for 5 minutes in a 5% aqueous alkaline sodium hypochlorite solution at 65° C., washed and dried.

The yarns are dyed to a deep red shade in a bath similar to that described in Example I.

EXAMPLE VII

A skein of yarns formed from a copolymer of acrylonitrile and vinyl chloride containing about 46% acrylonitrile in the molecule is immersed in 85% sulfuric acid for 2 minutes at 75–80° C., withdrawn, washed free of acid, immersed in 5% aqueous alkaline sodium hypochlorite solution, for 5 minutes at 65° C., rinsed, and dried.

The yarns are dyed in a dyebath similar to the bath described in Example I.

Any of the wool type acid dyestuffs may be used to dye the acrylonitrile polymers containing, in the polymer molecule, both CN and NH$_2$ groups.

The softening temperature for fibers or yarns of an acrylonitrile-acrylamide copolymer is higher than the softening temperature for fibers or yarns of copolymers of acrylonitrile with monomers other than acrylamide, such as isobutylene, vinyl acetate, etc. The articles of the present invention containing, in the molecule, acrylonitrile, acrylamide, and vinyl amine also have higher softening temperatures than the articles formed from copolymers of acrylonitrile with isobutylene, vinyl acetate, and most other monoethylenically unsaturated polymerizable monomers which do not contain the CONH$_2$ group.

The term "interpolymer" as used in the claims is intended to include both binary and ternary copolymers.

Various changes and modifications may be made in carrying out the process described without departing from the spirit and scope of the invention and therefore the invention is not to be limited except as defined by the appended claims.

We claim:

1. An acrylonitrile interpolymer containing acrylonitrile and vinyl amine in the interpolymer molecule.

2. An acrylonitrile interpolymer containing, in the interpolymer molecule, acrylonitrile, vinyl amine, and a substance selected from the group consisting of acrylamide and methacrylamide.

3. An acrylonitrile interpolymer containing, in the interpolymer molecule, from 70 to 98% acrylonitrile, from 0.1 to 15% vinyl amine, and the balance a substance selected from the group consisting of acrylamide and methacrylamide.

4. A shaped article having one dimension large relative to another of its dimensions, said article comprising an acrylonitrile interpolymer containing, in the interpolymer molecule, acrylonitrile and vinyl amine.

5. A shaped article having one dimension large relative to another of its dimensions, said article comprising an acrylonitrile interpolymer containing, in the interpolymer molecule, acrylonitrile and vinyl amine, the article being dyed with an acid wool dyestuff.

6. A shaped article comprising an acrylonitrile interpolymer dyed with an acid wool dyestuff and containing, in the interpolymer molecule, from 70 to 98% acrylonitrile, from 0.1 to 15% vinyl amine, and the balance selected from the group consisting of acrylamide and methacrylamide.

7. An oriented fiber of an acrylonitrile interpolymer containing, in the interpolymer molecule, from 70 to 98% acrylonitrile, from 0.1 to 15% vinyl amine, and the balance selected from the group consisting of acrylamide and methacrylamide, said fiber being stabilized against shrinkage on heating as a result of heating thereof in a free-to-shrink condition.

8. An oriented fiber of an acrylonitrile interpolymer dyed with an acid wool dyestuff and containing, in the interpolymer molecule, from 70 to 98% acrylonitrile, from 0.1 to 15% vinyl amine and the balance selected from the group consisting of acrylamide and methacrylamide, said fiber being stabilized against shrinkage on heating as a result of heating thereof in a free-to-shrink condition.

9. An oriented fiber of an acrylonitrile interpolymer containing, in the interpolymer molecule, acrylonitrile, vinyl amine, and a substance selected from the group consisting of acrylamide and methacrylamide, the acrylonitrile being present in an amount of about 88% by weight, said fiber being stabilized against shrinkage on heating as a result of heating thereof in a free-to-shrink condition.

10. An oriented fiber of an acrylonitrile interpolymer dyed with an acid wool dyestuff and containing, in the interpolymer molecule, acrylonitrile, vinyl amine, and a substance selected from the group consisting of acrylamide and methacrylamide, the acrylonitrile being present in an amount of about 88% by weight, said fiber being stabilized against shrinkage on heating as a result of heating thereof in a free-to-shrink condition.

11. An oriented fiber of an acrylonitrile interpolymer containing, in the interpolymer molecule, acrylonitrile, vinyl amine, and acrylamide, the acrylonitrile being present in an amount of about 80% by weight, said fiber being stabilized against shrinkage on heating as a result of heating thereof in a free-to-shrink condition.

12. An oriented fiber of an acrylonitrile interpolymer dyed with an acid wool dyestuff and containing in the interpolymer molecule, acrylonitrile, vinyl amine, and acrylamide, the acrylonitrile being present in an amount of about 80% by weight, said fiber being stabilized against shrinkage on heating as a result of heating thereof in a free-to-shrink condition.

13. An oriented fiber of an acrylonitrile interpolymer containing, in the interpolymer molecule, acrylonitrile, vinyl amine, and acrylamide, the acrylonitrile being present in an amount of about 93% by weight, said fiber being stabilized against shrinkage on heating as a result of heating thereof in a free-to-shrink condition.

14. An oriented fiber of an acrylonitrile interpolymer dyed with an acid wool dyestuff and containing in the interpolymer molecule, acrylonitrile, vinyl amine, and acrylamide, the acrylonitrile being present in an amount of about 93% by weight, said fiber being stabilized against shrinkage on heating as a result of heating thereof in a free-to-shrink condition.

15. A method of producing an acrylonitrile interpolymer containing, in the interpolymer molecule, acrylonitrile and vinyl amine, which comprises the step of treating a shaped article of an acrylonitrile polymer containing CN groups and $CONH_2$ groups with an aqueous alkaline solution of sodium hypochlorite of from 3 to 6% concentration for from 5 seconds to 30 minutes, at a temperature inversely related to the treating time between 65° C. and 35° C.

16. The method comprising treating an oriented fiber stabilized against shrinkage on heating as a result of heating thereof in a free-to-shrink condition, said fiber comprising an acrylonitrile interpolymer containing, in the interpolymer molecule, from 70 to 98% by weight acrylonitrile and the balance acrylamide, with an aqueous alkaline sodium hypochlorite solution of from 3 to 6% concentration for from 5 seconds to 30 minutes at a temperature inversely related to the treating time between 65° C. and 35° C., removing adhering hypohalite solution from the fiber, and drying the fiber.

DAVID W. CHANEY.
HELEN G. SOMMAR.

References Cited in the file of this patent

UNITED STATES PATENTS

| Number | Name | Date |
|---|---|---|
| 2,356,767 | Kropa | Aug. 29, 1944 |
| 2,432,447 | Scheiderbauer | Dec. 9, 1947 |
| 2,432,448 | Richards | Dec. 9, 1947 |
| 2,491,471 | Arnold | Dec. 20, 1949 |